June 10, 1958 W. I. EVANS ET AL 2,837,789
JOINING SPINDLE

Filed May 2, 1955 2 Sheets-Sheet 1

WILLIAM I. EVANS
ELIAS BLANCO
INVENTORS

BY
ATTORNEY

June 10, 1958   W. I. EVANS ET AL   2,837,789
JOINING SPINDLE

Filed May 2, 1955   2 Sheets-Sheet 2

WILLIAM I. EVANS
ELIAS BLANCO
INVENTORS

BY
ATTORNEY

United States Patent Office 2,837,789
Patented June 10, 1958

2,837,789

JOINING SPINDLE

William I. Evans, Danville, and Elias Blanco, Los Angeles, Calif.

Application May 2, 1955, Serial No. 505,443

9 Claims. (Cl. 20—92)

This invention relates to the joining of elements, and particularly to the spindle elements used in the assembling and disassembling of packages, crates, and frames.

In our Patent No. 2,464,743, of March 15, 1949, a method of making a joint between two elements is described and claimed. In Witte Patent No. 2,596,320, of March 13, 1952, assigned to us, a container or frame construction utilizing this joint is disclosed and claimed. In our co-pending application, Serial No. 484,893, filed January 31, 1955, a mortising machine for rapidly producing the mortises embodied in the invention is disclosed and claimed. In the above-mentioned patents, a spindle of the solid type is disclosed.

The present invention is directed to a new spindle of a type which can be economically produced or manufactured and which, while embodying all the features involved in the rapid assembly and disassembly of units using the spindle, provides a stronger and more reliable joint than that provided by prior spindles. The spindle is of light weight while providing greater strength, has greater wear-resisting properties, is more durable, and may be as quickly manipulated for joining frames as the old spindles while maintaining a more permanent joint.

The principal object of the invention, therefore, is to facilitate the assembly and disassembly of frames for various structures, such as screens, packages, and containers.

Another object of the invention is to provide an improved spindle for interconnecting frame sections of structures, such as containers and packages.

A further object of the invention is to provide an improved joint spindle which is economical to manufacture, can be made by stamping, is light in weight and durable, may be easily assembled, and which will provide a strong permanent joint if so desired.

The novel features which are believed to be characteristic of this invention, both as to the manner of its organization and the mode of its operation, will be better understood from the following description, when read in conjunction with the accompanying drawings, in which.

Figure 1:
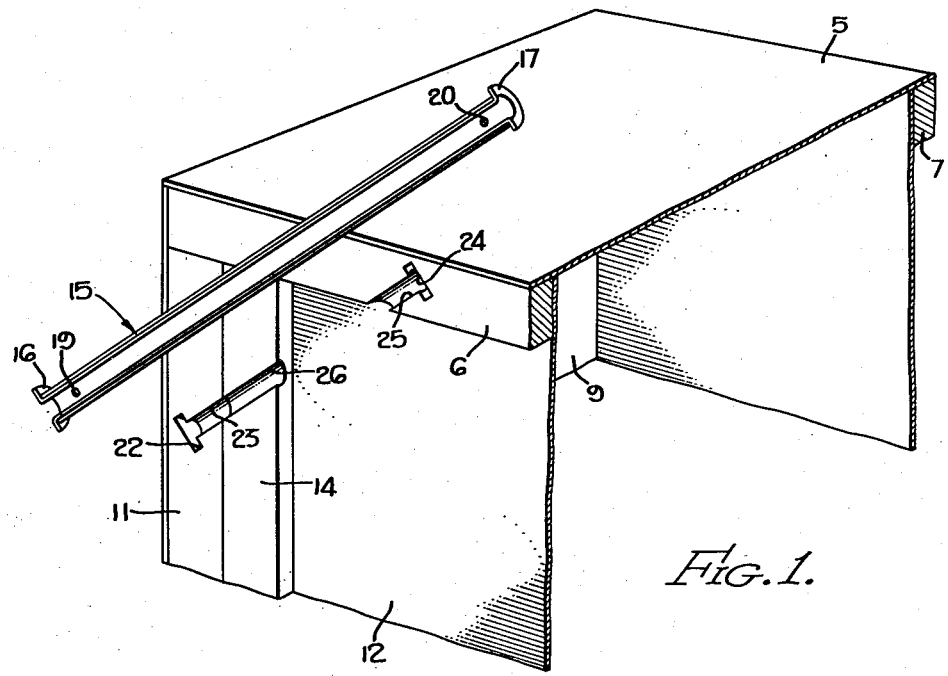
Fig. 1 is a perspective exploded view showing the use of the spindle embodying the invention.

Referring now to the drawings, part of a container is shown, a portion of its top being shown at 5 with end cleats 6 and 7, a portion of a side being shown at 9 with a cleat 11, and a portion of an end being shown at 12 with a cleat 14. Such a container is illustrated in the above-mentioned Witte patent. A spindle 15 is provided for interlocking cleats 6, 11, and 14, mortises being made in these cleats as disclosed and claimed in our above-mentioned co-pending application. The spindle itself is formed preferably from metal, although in cases of small packages, it may be formed of plastic, the spindle being hollow and having a body wall which extends over a portion of a circle substantially greater than 180 degrees; that is, the diameter of the spindle is greater than the width of the longitudinal opening in the spindle.

The ends of the spindle have two flanges 16 and 17 extending perpendicularly to the axis of the body of the spindle, and which have a greater diameter than the body portion of the spindle. Centered between the edges of the opening and near the ends of the spindle are two holes 19 and 20. The spindle is formed by a die press operation from a strip of flat material, preferably metal.

Figure 2:
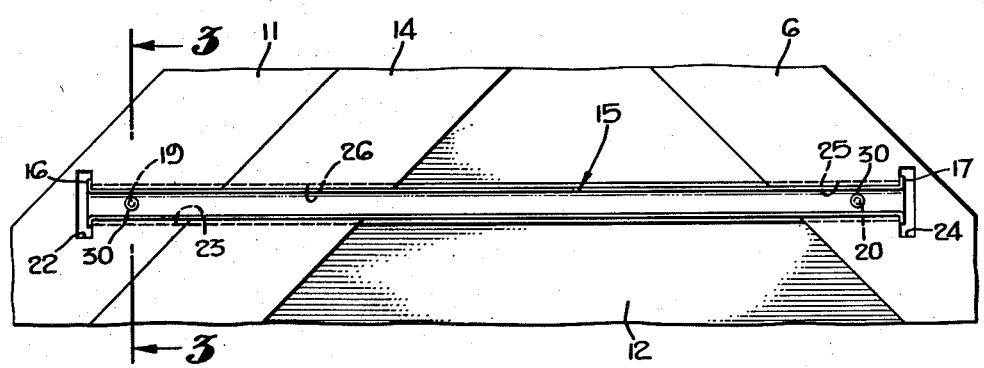
Fig. 2 is a detailed view of the spindle of the invention in use.

As shown in Fig. 2, the spindle 15 is in position in the mortises of the cleats 6, 11, and 14, the end flange 16 being in the portion 22 of the mortise having a greater diameter than the portion 23 of the mortise, and flange 17 being in the portion 24 of a mortise having a smaller diameter portion 25. Portions of the body of the spindle are in the mortise portions 23 and 25 and in a cylindrical mortise 26 in the cleat 14. The flanges 16 and 17 are flush against the shoulder of mortises 22—23 and 24—25 to prevent longitudinal or axial movement of the spindle.

Figures 4, 5:
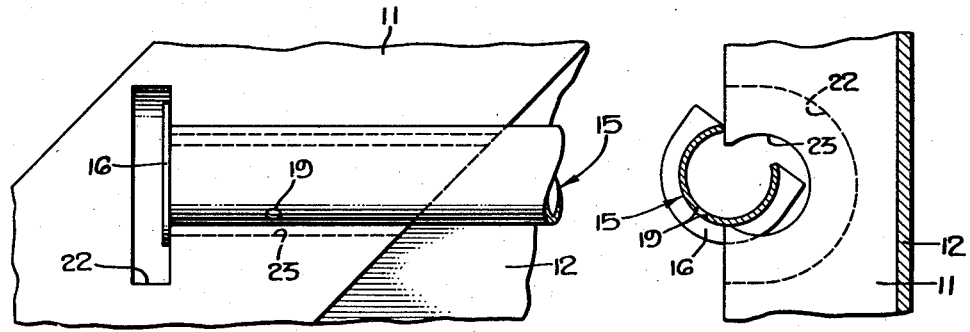
Fig. 4 is a detailed view illustrating the method of attaching the spindle to the frame sections.
Fig. 5 is an end view of the spindle and frame sections shown in Fig. 4.
Figures 6, 7:
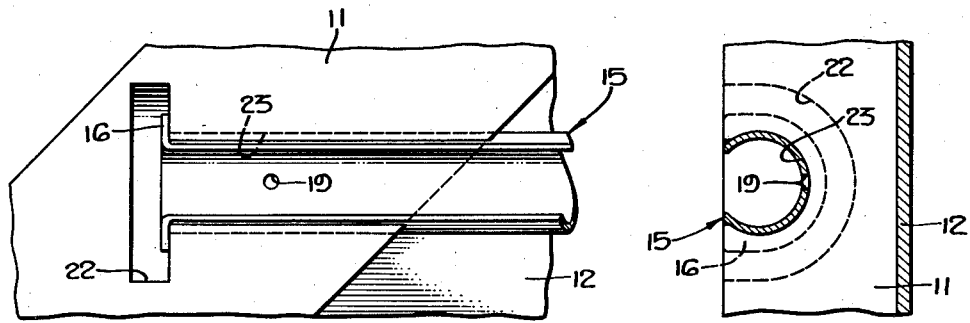
Fig. 6 is another view illustrating the method of attaching the spindle to the frame sections.
Fig. 7 is an end view of the spindle as shown in Fig. 6.

Referring now to Figs. 4 to 7, inclusive, the spindle 15 is shown in Figs. 4 and 5 in its starting position within the mortise portions 22 and 23. Since the perpendicular distance from the plane of the edges of the opening in the spindle to the center of the spindle is greater than the width of the opening to the mortise portion 23, one edge of the longitudinal opening in the spindle is first inserted in the mortise. The spindle is then rotated to bring it to the position shown in Figs. 6 and 7. The spindle is now fixed in the mortise and cannot be moved perpendicularly to its longitudinal axis because its diameter is larger than the width of the opening to the mortise portion 23, while the flange 16 prevents it from moving longitudinally except within the confines of the mortise 22. However, since the flange 17 in the mortise portion 24 on cleat 6 will prevent such movement, the spindle is held from any movement longitudinally, as shown in Fig. 2. This hollow spindle provides a stronger joint than the solid spindle shown in the above-mentioned patents, because the contact surface between spindle and mortise is greater, which provides more mortise to resist movement of the spindle perpendicular to its axis. With a solid spindle, the width of the opening in the mortise had to be slightly greater than the perpendicular distance from the flat side of the spindle to the center of the spindle. With a hollow spindle, this width may be less, thus providing a more complete circle for the mortise.

Figure 3:
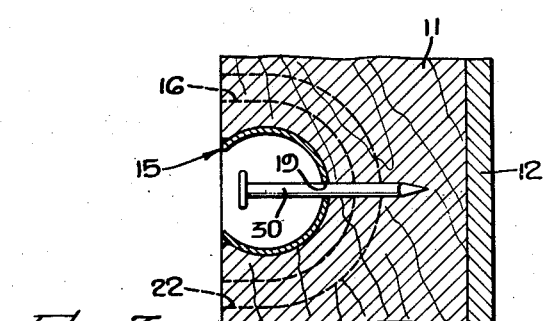
Fig. 3 is a cross-sectional view of the spindle taken along the line 3—3 of Fig. 2.

Although the spindle may normally be held fixed by the friction between the outer surface of the body portion of the spindle 15 and the surface of the mortise, to assure that this locking position is maintained at all times, a small nail such as shown at 30 in Fig. 3 may be driven into the cleats 6 and/or 11 to the extent shown in this figure. When it is desired to disassemble the crate, the nail 30 may be easily removed so that the spindle may be rotated and thereby removed in the reverse action of its assembly.

Figure 8:
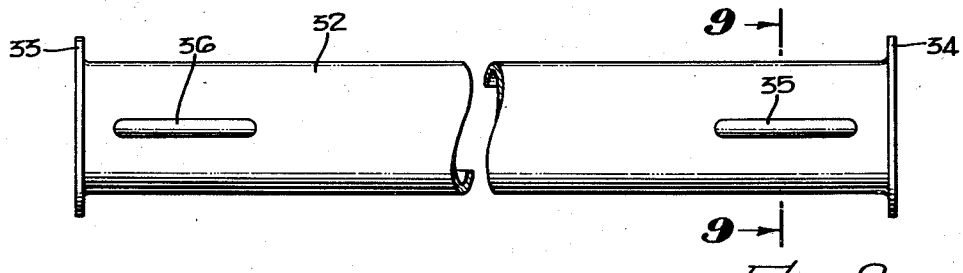
Fig. 8 is a plan view showing a modification of the spindle shown in the previous figures.
Figure 9:
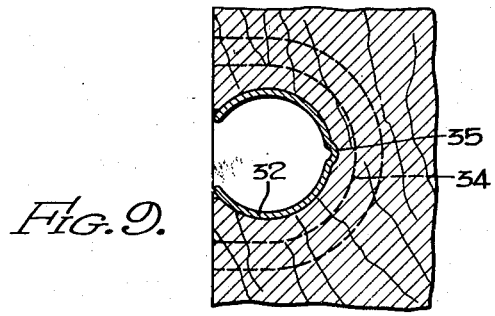
Fig. 9 is a cross-sectional view of the spindle shown in Fig. 8 in assembled position and taken along the line 9—9 of Fig. 8.

To eliminate the use of nails, such as shown at 30, the spindle shown in Figs. 8 and 9 may be used. This spindle has a body portion 32 and end flanges 33 and 34, which may be identical with the spindle 15 shown in Figs. 1 to 7, inclusive. However, during the stamping operation producing the spindle, longitudinal detents or ribs 35 and 36 at the center of the spindle are formed. These ribs extend outwardly from the external circular surface of the body portion of the spindle so that although they provide a certain resistance to the rotation of the spindle when assembling a box or crate, they do not interfere with such assembly. Although these detents are shown as a pair of ribs, it is to be understood that they may be a continuous rib, or one or several dimples on the outer surface of the spindle. They may also be placed on the inner surfaces of the flanges.

After the spindle is once positioned within the mortise, as shown in Fig. 9, the rib will have a tendency to depress the inner surface of the mortise, which is usually of wood, and imbed itself therein. Thus, a lock is provided between the spindle and the cleat. This lock will prevent rotation of the spindle in its mortise in the handling of a crate in the same manner as the nail 30 shown in Fig. 3. However, rotation of the spindle is not prevented when the crate is disassembled except for a slightly higher turning torque to start the rotation of the spindle. Since the spindles are generally rotated with a tool, any slight additional torque required is not detrimental to the rapid assembling and disassembling of the crates using the type of spindles shown in Figs. 8 and 9. It is also to be understood that the mortises may be formed with receiving sockets for the ribs if desired.

We claim:

1. A spindle and mortise combination used for interlocking or joining elements having mortises with circular portions of a certain diameter and longitudinal openings to said circular portions having a width less than the diameter of said mortises, comprising a spindle having a hollow cylindrical body portion with an external diameter substantially the same as the internal diameter of said circular portions of said mortises, said body portion also having a longitudinal opening therein having a width less than the diameter of said spindle and of substantially the same width as the width of said longitudinal openings in the circular portions of said mortises.

2. A spindle and mortise combination in accordance with claim 1, in which said mortise has circular sections abutting said circular portions and having a greater diameter than said circular portion, said circular sections having openings equal to the diameter of said circular sections.

3. A spindle and mortise combination in accordance with claim 2, in which said spindle is provided with flanges at the ends thereof, said flanges extending perpendicular to the axis of said spindle and positioned in said circular sections having openings equal to the diameter of said circular sections.

4. A spindle and mortise combination in accordance with claim 1, in which the width of the longitudinal opening in said spindle is less than the diameter of said mortises, said spindle being provided with holes adjacent the ends of said spindle for accommodating means passing therethrough into said elements.

5. A spindle and mortise combination in accordance with claim 1, in which means are formed on the external surface of the body of the spindle to resist rotation of said spindle in said mortises.

6. A spindle comprising a rigid hollow cylindrical body portion having a longitudinal opening therein of a width slightly less than the diameter of said cylindrical body portion, said spindle being adapted to be accommodated in a circular mortise section having an internal diameter substantial the same as the external diameter of said body portion, the edges of said longitudinal opening in said body portion of said spindle being in contact with the edges of an opening in said mortise.

7. A spindle in accordance with claim 6, in which flanges extend from the ends of said cylindrical body portion perpendicular to the axis of said spindle, said flanges being accommodated in circular mortise sections at the ends of said first-mentioned circular mortise section.

8. A spindle in accordance with claim 6, in which gripping means are provided on said spindle, said gripping means being spaced substantially equidistant from the edges of said opening.

9. A spindle in accordance with claim 8, in which said means are longitudinal ribs extending outwardly from the surface of said cylindrical body portion and substantially along the center thereof.

References Cited in the file of this patent

UNITED STATES PATENTS

| | | |
|---|---|---|
| 722,249 | Pixley | Mar. 10, 1903 |
| 1,073,182 | Tissier | Sept. 16, 1913 |
| 1,669,847 | Zimmerman | May 15, 1928 |
| 1,724,610 | McArthur | Aug. 13, 1929 |
| 2,236,926 | Surface | Apr. 1, 1941 |
| 2,596,320 | Witte | May 13, 1952 |

FOREIGN PATENTS

| | | |
|---|---|---|
| 57,925 | Denmark | Aug. 26, 1940 |